(12) United States Patent
Nakashima et al.

(10) Patent No.: US 6,455,154 B1
(45) Date of Patent: Sep. 24, 2002

(54) PRODUCTION OF SHORT FIBER SILICA

(75) Inventors: Akira Nakashima; Kazuaki Inoue; Ryo Muraguchi; Michio Komatsu, all of Kitakyushu (JP)

(73) Assignee: Catallysts & Chemicals Industries Co., Ltd. (JP)

( * ) Notice: Subject to any disclaimer, the term of this patent is extended or adjusted under 35 U.S.C. 154(b) by 0 days.

(21) Appl. No.: 09/560,984

(22) Filed: Apr. 28, 2000

Related U.S. Application Data

(62) Division of application No. 09/130,043, filed on Aug. 6, 1998, now Pat. No. 6,083,314.

(30) Foreign Application Priority Data

Aug. 7, 1997 (JP) .............................. 9-225659

(51) Int. Cl.⁷ .............................. D02G 3/00; D01F 1/02
(52) U.S. Cl. ...................... 428/359; 428/361; 428/367; 264/204; 264/5; 264/211
(58) Field of Search ................. 428/359, 367, 428/361; 264/5, 517, 204, 211

(56) References Cited

U.S. PATENT DOCUMENTS 3,907,954 A * 9/1975 Mansmann et al. ........... 264/63

FOREIGN PATENT DOCUMENTS

| JP | 02242226 | 9/1990 |
|---|---|---|
| JP | 05263045 | 10/1993 |

OTHER PUBLICATIONS

Japanese publication, *Nikkei Microdevices* No. 71, pp. 52–58 (May 1991) w/ one–page English abstract.

* cited by examiner

*Primary Examiner*—Cynthia H. Kelly
*Assistant Examiner*—J. M. Gray
(74) *Attorney, Agent, or Firm*—Webb Ziesenheim Logsdon Orkin & Hanson, P.C.

(57) ABSTRACT

A coating liquid for forming porous silica coating, comprising a product of reaction between a short fiber silica and a hydrolyzate of an alkoxysilane of the formula $X_nSi(OR)_{4-n}$ or a halogenated silane of the formula $X_nSiX'_{4-n}$ (in the formula, X represents a hydrogen atom, a fluorine atom, an alkyl group having 1 to 8 carbon atoms, an aryl group or a vinyl group; R represents a hydrogen atom, an alkyl group having 1 to 8 carbon atoms, an aryl group or a vinyl group; X' represents a chlorine atom or a bromine atom; and n is an integer of 0 to 3). A coated substrate comprising a porous silica coating film formed from the above coating liquid for forming porous silica coating. A short fiber silica having an average diameter (D) of 10 to 30 nm, a length (L) of 30 to 100 nm and an aspect ratio (L/D) of 3 to 10. The above coating liquid for forming porous silica coating enables forming an insulating film which is excellent in adherence to a substrate surface, mechanical strength, chemical resistance and crack resistance and enables flattening irregularities of a substrate surface to a high degree. The coating film of the coated substrate has the above excellent properties.

3 Claims, 1 Drawing Sheet

80 n m

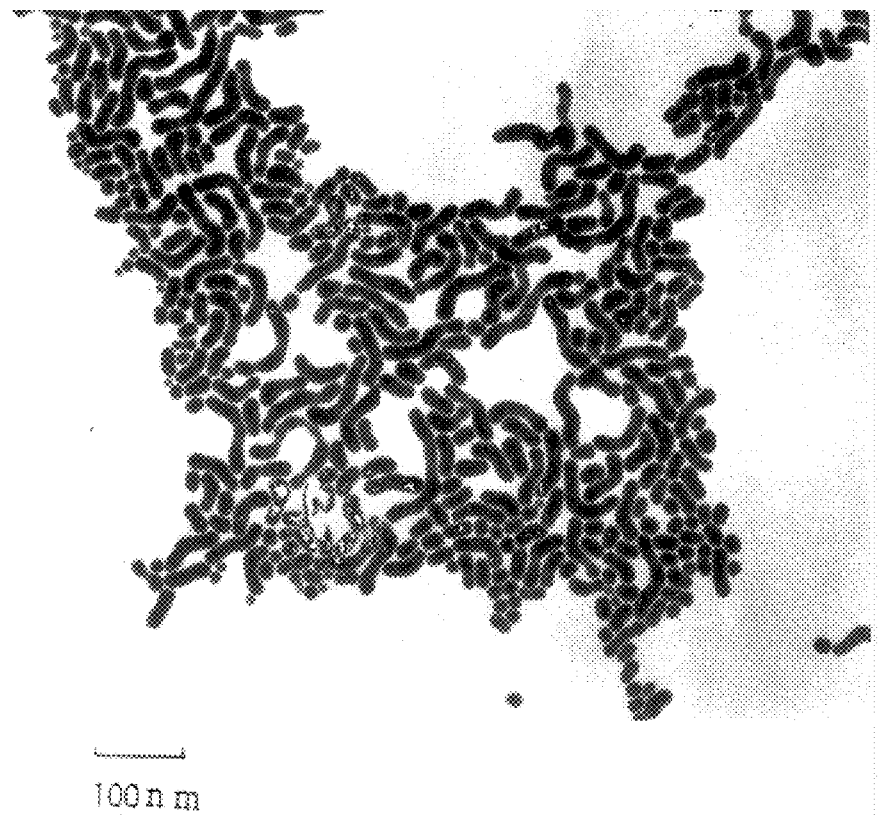
Fig. 1   100 nm
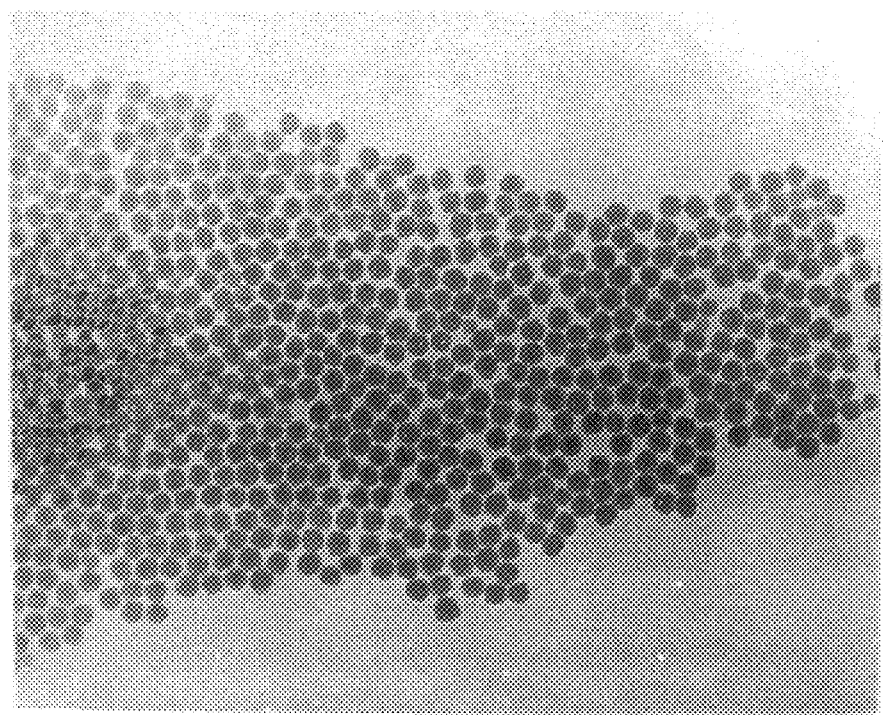
Fig. 2   80 nm

PRODUCTION OF SHORT FIBER SILICA

CROSS-REFERENCE TO RELATED APPLICATION

This application is a divisional of U.S. Ser. No. 09/130,043 filed Aug. 6, 1998 now U.S. Pat. No. 6,083,314.

FIELD OF THE INVENTION

The present invention relates to a coating liquid for the formation of porous silica coating, which enables forming an insulating film having a void content of as large as at least 30% and having excellent adherence to a substrate surface excellent, mechanical strength, chemical resistance (e.g., alkali resistance) and crack resistance and which enables the flattening of irregularities of a substrate surface to a high degree. Further, the present invention relates to a substrate provided with the above porous silica coating, a short fiber silica and a process for producing such a silica.

BACKGROUND OF THE INVENTION

The silica coating is used in the following fields.

(1) Semiconductor Device:

In semiconductor devices, an insulating coating is provided, for insulation, between a semiconductor substrate and a metal wiring layer such as an aluminum wiring layer or between metal wiring layers. Further, in semiconductor devices, various elements such as a PN junction semiconductor, a condenser element and a resistor element superimposed on a semiconductor substrate are covered with an insulating coating in order to protect them. When, for example, a metal wiring layer is disposed on the semiconductor substrate, the surface of the semiconductor substrate becomes irregular due to the metal wiring layer. Formation of a further metal wiring layer or the like on the irregular surface may cause a disconnection of wiring because of the level difference attributed to the irregularity. Consequently, in semiconductor devices, the silica coating is used as an insulating coating capable of effectively flattening the irregular surface brought about by the above metal wiring layer and other various elements.

(2) Liquid Crystal Display:

For example, the matrix type color liquid crystal display is fitted with a liquid crystal display cell comprising an electrode plate, a counter electrode plate and a liquid crystal layer interposed between the electrode plate and the counter electrode plate. The electrode comprises a glass plate and, superimposed thereon, a picture element electrode composed of, for example, TFT (thin film transistor). The counter electrode comprises a glass plate and, superimposed thereon, a color filter and transparent electrodes in this order.

In the liquid crystal display cell used in the liquid crystal display, the picture element electrode protrudes on the electrode plate and the color filter protrudes on the counter electrode plate, so that the respective surfaces of these electrode plates have level differences. The level differences of the electrode surfaces cause a cell gap to be nonuniform, so that the alignment of liquid crystal material sealed inside the liquid crystal display cell tends to be disordered and the displayed image tends to suffer from picture disorder such as color shade. Therefore, it was proposed to provide the silica coating on the picture element electrode of the electrode plate and on the color filter of the counter electrode plate, thereby flattening irregular surfaces attributed to the picture element electrode and the color filter (see Japanese Patent Laid-open Publication No. 2(1990)-242226).

(3) Photomask with Phase Shifter:

The method is known in which the silica coating is provided as a phase shifter disposed for deviating the phase of irradiation light on a photomask so that a high-resolution irregular pattern is formed on a substrate by lithography, thereby enhancing the resolution of irregular pattern formed on the substrate (Nikkei Microdevice No. 71, 52 58, (5), 1991).

The silica coating employed in the above fields is generally formed on the substrate by the vapor phase growing method such as the CVD process or sputtering process or the coating method in which a coating film is formed from a coating liquid for forming silica coating. However, the vapor phase growing method such as the CVD process has drawbacks in that workload is heavy and large facilities are required and in that it is difficult to flatten the irregular surface of the substrate.

By contrast, the coating method is widely performed because large facilities are not required and because the flattening of the irregular surface can easily be carried out.

In the formation of the silica coating according to the above coating method, use is made of a coating liquid for forming silica coating which contains a polycondensate of a partial hydrolyzate of alkoxysilane as a film forming component. However, the formation of the coating film from the above coating liquid for forming silica coating has a drawback in that, during the stage of polycondensation of the partial hydrolyzate of alkoxysilane, silanol groups mutually induce a dehydration reaction at segments other than the terminals of the condensate so that the crosslinking of the condensate is advanced. This, in the formation of the silica coating, leads to an intense film shrinkage stress, thereby causing a film cracking with the result that it is difficult to obtain a silica coating having excellent crack resistance.

By contrast, the coating liquid for forming silica coating which contains fine particles of silica was proposed (see, for example, Japanese Patent Laid-open Publication No. 5(1993)-263045). It is known that the formation of the silica coating from the above coating liquid improves the crack resistance of the silica coating to a certain degree. In this coating liquid for forming silica coating, spherical silica particles obtained by hydrolyzing an alkoxysilane are used as the fine particles of silica. However, unreacted alkoxy groups remain in such fine particles of silica, so that, at the time of film formation, the alkoxy groups are oxidized so as to change to silanol groups. The silanol groups are likely to undergo a dehydration reaction to thereby advance the crosslinking of the condensate with the result that the crack resistance of the coating film is not satisfactory. A further problem is that because the fine particles of silica are spherical, the bonding strength between the fine particles of silica is unsatisfactory, thereby resulting in unsatisfactory film strength.

The inventors have conducted extensive studies on the basis of the above views. As a result, it has been found that

- fine particles of silica prepared under specified conditions scarcely contain unreacted alkoxy groups and are in the form of short fibers;
- the silica coating film formed from the coating liquid which contains the above short fiber silica is porous and maintains a desirable film strength; and
- a coated substrate whose performance is superior to that of the prior art can be obtained by the use of the above coating liquid which contains the short fiber silica. The present invention has been completed on the basis of these findings.

The present invention has been made with a view toward solving the above problem of the prior art. An object of the present invention is to provide a coating liquid for forming porous silica coating, which enables the formation of an insulating film having excellent in adherence to a substrate surface, excellent mechanical strength, chemical resistance (e.g., alkali resistance) and crack resistance and which enables the flattening of irregularities of a substrate surface to a high degree. Another object of the present invention is to provide a substrate furnished with the above porous silica coating having excellent properties.

SUMMARY OF THE INVENTION

The coating liquid for forming porous silica coating according to the present invention comprises a product of reaction between:

a short fiber silica, and a hydrolyzate of an alkoxysilane represented by the below indicated general formula [1] or a halogenated silane represented by the below indicated general formula [2]:

$$X_nSi(OR)_{4-n} \quad [1],$$

$$X_nSiX'_{4-n} \quad [2],$$

wherein X represents a hydrogen atom, a fluorine atom, an alkyl group having 1 to 8 carbon atoms, an aryl group or a vinyl group; R represents a hydrogen atom, an alkyl group having 1 to 8 carbon atoms, an aryl group or a vinyl group; X' represents a chlorine atom or a bromine atom; and n is an integer of 0 to 3.

The above short fiber silica is preferably one obtained by hydrolyzing at least one alkoxysilane represented by the above general formula (11 and, thereafter, subjecting the hydrolyzate to a hydrothermal treatment at 250° C. or higher temperature.

The coated substrate of the present invention comprises a porous silica coating film formed from the above coating liquid for forming porous silica coating. The short fiber silica of the present invention has an average diameter (D) of 10 to 30 nm, a length (L) of 30 to 100 nm and an aspect ratio (L/D) of 3 to 10.

This short fiber silica can be produced by a process comprising the steps of:

adding a catalyst such as ammonia to a solution of a mixture of water, an organic solvent and at least one alkoxysilane represented by the above general formula [1] to thereby conduct a hydrolysis of the alkoxysilane so that fine particles of silica having a particle size of 10 to 30 nm are produced;

removing any unreacted alkoxysilane, the organic solvent and the catalyst from the thus obtained reaction mixture solution to thereby obtain a water dispersion of fine particles of silica;

regulating so that the water dispersion has a fine silica particle solid content of 0.1 to 5% by weight and a catalyst concentration of 50 to 400 ppm in the term of ammonia; and subjecting the water dispersion to a hydrothermal treatment at 250° C. or higher temperature.

BRIEF DESCRIPTION OF THE DRAWING

FIG. 1 is an electron micrograph of a short fiber silica; and FIG. 2 is an electron micrograph of fine particles of silica.

DETAILED DESCRIPTION OF THE INVENTION

The short fiber silica, coating liquid for forming porous silica coating and coated substrate according to the present invention will be described in detail below.

[Short Fiber Silica]

The short fiber silica of the present invention has an average diameter (D) of 10 to 30 nm, preferably, 10 to 20 nm, a length (L) of 30 to 100 nm, preferably, 30 to 60 nm and an aspect ratio (L/D) of 3 to 10, preferably, 3 to 5. When the length is smaller than 30 nm, the coating film is not porous. On the other hand, when the length is greater than 100 nm, defects are likely to occur at the time of fine working during a photolithography step.

The above short fiber silica can be obtained by: hydrolyzing at least one alkoxysilane represented by the general formula:

$$X_nSi(OR)_{4-n} \quad [1]$$

wherein X represents a hydrogen atom, a fluorine atom, an alkyl group having 1 to 8 carbon atoms, an aryl group or a vinyl group; R represents a hydrogen atom, an alkyl group having 1 to 8 carbon atoms, an aryl group or a vinyl group; and n is an integer of 0 to 3, and, thereafter, subjecting the hydrolyzate to a hydrothermal treatment at 250° C. or higher temperature.

Examples of the alkoxysilanes represented by the general formula [1] include tetramethoxysilane, tetraethoxysilane, tetraisopropoxysilane, tetrabutoxysilane, tetraoctylsilane, methyltrimethoxysilane, methyltriethoxysilane, methyltriisopropoxysilane, ethyltrimethoxysilane, ethyltriethoxysilane, ethyltriisopropoxysilane, octyltrimethoxysilane, octyltriethoxysilane, vinyltrimethoxysilane, vinyltriethoxysilane, phenyltrimethoxysilane, phenyltriethoxysilane, trimethoxysilane, triethoxysilane, triisopropoxysilane, fluorotrimethoxysilane, fluorotriethoxysilane, dimethyldimethoxysilane, dimethyldiethoxysilane, diethyldimethoxysilane, diethyldiethoxysilane, dimethoxysilane, diethoxysilane, difluorodimethoxysilane, difluorodiethoxysilane, trifluoromethyltrimethoxysilane and trifluoromethyltriethoxysilane.

The hydrolysis of these alkoxysilanes is conducted in the presence of water, an organic solvent and a catalyst.

Examples of suitable organic solvents include alcohols, ketones, ethers and esters. Specifically, use can be made of alcohols such as methanol, ethanol, propanol and butanol, ketones such as methyl ethyl ketone and methyl isobutyl ketone, glycol ethers such as methyl cellosolve, ethyl cellosolve and propylene glycol monopropyl ether, glycols such as ethylene glycol, propylene glycol and hexylene glycol and esters such as methyl acetate, ethyl acetate, methyl lactate and ethyl lactate.

As the catalyst, use can be made of basic compounds such as ammonia, amines, alkali metal hydrides, quaternary ammonium compounds and amine coupling agents.

The amount of water required for the hydrolysis of the above alkoxysilane is preferably 0.5 to 50 mol, still preferably, 1 to 25 mol per mol of the group Si—OR as a constituent of the alkoxysilane. The catalyst is preferably added in an amount of 0.01 to 1 mol, still preferably, 0.05 to 0.8 mol per mol of the alkoxysilane. The hydrolysis of the above alkoxysilane is generally conducted at temperatures lower than the boiling point of the employed solvent, preferably, at temperatures of 5 to 10° C. lower than the boiling point under atmospheric pressure. However, when a heat resistant, pressure resistant vessel such as an autoclave is used, the hydrolysis temperature can be higher than the above.

When the hydrolysis is conducted under the above conditions, the polycondensation of the alkoxysilane is developed three-dimensionally, so that silica particles having a particle size of 10 to 30 nm are produced. Short fiber silica can be obtained by subjecting the produced fine particles of silica to a hydrothermal treatment at 250° C. or above, preferably, 270° C. or above. This short fiber silica can be produced by, for example, the following process.

(1) First, a catalyst is added to a solution of a mixture of water, an organic solvent and at least one alkoxysilane represented by the above general formula [1] to thereby conduct a hydrolysis of the alkoxysilane so that fine particles of silica having a particle size of 10 to 30 nm are produced.

(2) Subsequently, any unreacted alkoxysilane, the organic solvent and the catalyst are removed from the thus obtained reaction mixture solution to thereby obtain a water dispersion of fine particles of silica. The removal of unreacted alkoxides, the organic solvent and the catalyst can be performed by the use of, for example, an ultrafiltration membrane.

(3) According to necessity, water is added to the obtained water dispersion so that the solid content (fine particles of silica) thereof is regulated to 0.1 to 5% by weight, preferably, 0.5 to 2% by weight. Also, according to necessity, an additional alkali such as ammonia is added to the obtained water dispersion so that the catalyst concentration is regulated to 50 to 400 ppm, preferably, 50 to 200 ppm and, still preferably, 50 to 100 ppm in the term of ammonia. In this connection, when ammonia is used as the catalyst for alkoxysilane hydrolysis and when the amount of ammonia remaining in the dispersion falls in the above range, it is not necessary to add further ammonia.

(4) The thus obtained water dispersion is subjected to a hydrothermal treatment at 250° C. or higher temperature, preferably, 270° C. or higher temperature.

The hydrothermal treatment is performed in a heat resistant, pressure resistant vessel such as an autoclave.

The short fiber silica having a particle size of 10 to 30 nm can be obtained by this hydrothermal treatment which would give the two-dimensional growth of the above fine particles of silica.

The morphological change of silica particles by the hydrothermal treatment can be controlled by the above ammonia concentration and treatment temperature. For example, when the amount of ammonia is too small, the obtained short fiber silica lacks stability and may be likely to suffer from aggregation. On the other hand, when the amount of ammonia is too large, it may happen that the short fiber silica cannot be obtained. After the hydrothermal treatment, the dispersion of short fiber silica can be deionized by bringing it into contact with an ion exchange resin. This deionization enables the enhancement of the reactivity with the silane compound as described below.

The thus obtained short fiber silica scarcely contains residual alkoxy groups and is a porous material with low density.

[Coating Liquid for Forming Porous Silica Coating]

The coating liquid for forming porous silica coating according to the present invention comprises a product of reaction between:

a short fiber silica, and a hydrolyzate of an alkoxysilane represented by the general formula [1] or a halogenated silane represented by the general formula [2].

The short fiber silica is as mentioned above.

Hydrolyzate of Alkoxysilane or Halogenated Silane

In the present invention, use is made of a hydrolyzate of an alkoxysilane represented by the below indicated general formula [1] or a halogenated silane represented by the below indicated general formula [2]:

    [1],

    [2], wherein X represents a hydrogen atom, a fluorine atom, an alkyl group having 1 to 8 carbon atoms, an aryl group or a vinyl group; R represents a hydrogen atom, an alkyl group having 1 to 8 carbon atoms, an aryl group or a vinyl group; X' represents a chlorine atom or a bromine atom; and n is an integer of 0 to 3.

The alkoxysilane represented by the general formula [1] is as mentioned above.

The halogenated silane represented by the general formula [2] is, for example, trichlorosilane, tribromosilane, dichlorosilane, fluorotrichlorosilane or fluorotribromosilane.

The above hydrolyzate of alkoxysilane or halogenated silane is obtained by subjecting the alkoxysilane or halogenated silane to hydrolysis and polycondensation in the presence of water, an organic solvent and a catalyst.

The organic solvent used in the hydrolysis is as mentioned above.

As the catalyst, use can be made of not only those mentioned hereinbefore but also an inorganic acid such as hydrochloric acid, nitric acid or sulfuric acid, an organic acid such as acetic acid, oxalic acid or toluenesulfonic acid, or a compound exhibiting acidity in a water solution such as metallic soap.

The amount of water required for this hydrolysis is preferably 0.1 to 5 mol, still preferably, 0.1 to 2 mol per mol of the group Si—OR as a constituent of the alkoxysilane or the group Si—X' as a constituent of the halogenated silane.

The catalyst is preferably added in an amount of 0.001 to 1 mol per mol of the alkoxysilane or halogenated silane.

It is preferred that the number average molecular weight of the hydrolyzate obtained by the hydrolysis conducted under the above conditions ranges from 1000 to 50,000, especially, 2000 to 20,000 (molecular weight in terms of polystyrene).

The use of this hydrolyzate suppresses the aggregation of fine particles of silica and a gelation and enables obtaining a stable coating liquid.

Product of Reaction Between Short Fiber Silica and Above-mentioned Hydrolyzate

It is presumed that, in this reaction product, the above hydrolyzate is bonded to at least part of the surface of the short fiber silica.

This reaction product can be obtained by first mixing the above dispersion of short fiber silica with the above hydrolyzate and then heating the mixture at about 100° C. or below, preferably, 80° C. or below for 0.5 to 20 hr, preferably, 0.5 to 10 hr.

The mixing and reaction of the short fiber silica with the hydrolyzate of alkoxysilane or halogenated silane is preferably conducted in a weight ratio of [weight of short fiber silica (A)]/[weight of hydrolyzate (B)] ranging from 0.1 to 20, still preferably, 1 to 10.

When the weight of the short fiber silica (A) is too large, the obtained silica coating becomes a porous material containing a large proportion of intergranular voids of short fiber silica, so that, although the void content is large, the adherence to a substrate surface, mechanical strength and chemical resistance (e.g., alkali resistance) are poor and it is probable that the crack resistance and adherend surface flattening capability will be deteriorated. On the other hand, when the weight of the hydrolyzate (B) is too large, the obtained silica coating has its intergranular voids of short fiber silica filled with the hydrolyzate (B), so that it is probable for the increase of void content to be infeasible.

With respect to the reaction between the short fiber silica and the hydrolyzate, it is presumed that the growth of short fiber silica or the formation of new silica particles would not occur and that a surface reaction between the short fiber silica and the hydrolyzate would occur on the surface of the short fiber silica.

It is preferred that this reaction product be contained in the coating liquid for forming porous silica coating in an amount of 5 to 40% by weight, especially, 10 to 3.0% by weight in terms of solid content (in the term of $SiO_2$).

When the silica coating is formed from the coating liquid containing the above reaction product, not only does the coating film become porous due to the intergranular voids of short fiber silica but also the hydrolyzate bonded to the surface exerts the effect of preventing the re-adsorption of water onto the intergranular voids of the coating film. Further, the silica particles are in the form of fibers, so that the film strength is maintained. Therefore, a stable porous silica coating with excellent flattening performance can be formed.

No peak ascribed to the group OH is observed in the analysis of an FT-IR spectrum of the silica coating film obtained by applying the coating liquid containing the above reaction product onto a substrate, heating at 400° C. in an oxygen containing gas atmosphere (for example, nitrogen gas that contains 1000 ppm of oxygen) and allowing the fired coated substrate at ordinary room temperature for one week.

[Coated Substrate]

The coated substrate of the present invention comprises a porous silica coating film formed from the above coating liquid.

This coated substrate is obtained by applying the above coating liquid to a surface of any of various substrates and heating.

The application of the coating liquid can be conducted by various methods such as the spraying method, spin coating method, dip coating method, roll coating method and transfer printing method. The heating of coating liquid is conducted at 300 to 450° C., preferably, 350 to 400° C.

The above heating may be accompanied by the curing of coating which is effected by irradiation with ultraviolet rays or electron beams or by plasma treatment.

The coated substrate of the present invention is used in, for example, an electronic component such as a semiconductor device, a liquid crystal display, a printed circuit board or LSI element having a multilayer wiring structure, a hybrid IC or an alumina substrate, a photomask with a phase shifter, or a triple layer resist.

In the semiconductor device, the porous silica coating is formed, for example, on a silicon substrate, between wiring layers of a semiconductor device having a multilayer wiring structure, on an element surface or on a PN junction part.

In the liquid crystal display cell of the color liquid crystal display, the porous silica coating is formed between a TFT element and an ITO picture element electrode layer.

In the phase shifter of the photomask with phase shifter and the triple layer resist, the porous silica coating is constructed in an intermediate layer. Furthermore, in the above electronic components, the porous silica coating is formed as a flattening film. Although varied depending on the substrate to be coated and the object, for example, the thickness of the porous silica coating formed in the above manner ranges from about 100 to 250 nm in the formation on a silicon substrate of a semiconductor device and ranges from 300 to 500 nm in the formation between wiring layers of a multilayer wiring.

The coating liquid for forming porous silica coating according to the present invention enables the formation of a porous insulating film which has excellent adherence to a substrate surface, excellent mechanical strength, chemical resistance (e.g., alkali resistance) and crack resistance and further enables the flattening of irregularities of a substrate surface to a high degree.

The coated substrate of the present invention is furnished with a porous insulating film which has excellent adherence to a substrate surface, excellent mechanical strength, chemical resistance (e.g., alkali resistance) and crack resistance and realizes flattening of irregularities of a substrate surface to a high degree.

EXAMPLE

The present invention will now be illustrated in greater detail with reference to the following Examples, which in no way limit the scope of the invention.

Production Examples

1. Preparation of Short Fiber Silica:

139.1 g of pure water was mixed with 169.9 g of methanol to thereby obtain a mixed solvent. The mixed solvent was held at 60° C., and 2982.5 g of a water/methanol solution of tetraethoxysilane (Ethyl Silicate 28 produced by Tama Chemicals Co., Ltd.) (532.5 g of tetraethoxysilane dissolved in 2450 g of a water/methanol (weight ratio: 2/8) mixed solvent) and 596.4 g of 0.25% aqueous ammonia were simultaneously added thereto over a period of 20 hr by a dropping method. After the completion of the addition, the mixture was aged at the same temperature for 3 hr. Thereafter, unreacted tetraethoxysilane, methanol and ammonia were nearly completely removed with the use of an ultrafiltration membrane, and pure water was added so that the silica content was regulated to 1% by weight. The ammonia concentration was measured by means of an ion electrode and found to be 83 ppm.

The mixture was subjected to a hydrothermal treatment in a 300° C. autoclave for 10 hr and, after the treatment, purified with the use of amphoteric ion exchange resin (AG-501 produced by Bio-Rad). Thus, short fiber silica (A) having an average diameter of 20 nm and a length of about 80 nm was obtained.

A transmission electron micrograph of obtained short fiber silica (A) is shown in FIG. 1.

The hydrolysis of tetraethoxysilane was carried out in the same manner as described above and the purification was performed by ultrafiltration to thereby regulate the silica content and the ammonia concentration to 1% by weight and 105 ppm, respectively. Hydrothermal treatment was performed in a 200° C. autoclave for 10 hr. Thus, fine particles of silica (B) having an average diameter of 20 nm were obtained.

A transmission electron micrograph of obtained fine particles of silica (B) is shown in FIG. 2.

2. Preparation of Hydrolyzates of Alkoxysilane and Halogenated Silane:

250 g of triethoxysilane was mixed with 750 g of methyl isobutyl ketone, and 1000 g of a 0.01% by weight aqueous hydrochloric acid solution was added thereto. The mixture was reacted at 50° C. for 1 hr under agitation. The reaction mixture was allowed to stand still, and an upper layer forming methyl isobutyl ketone solution was separated, thereby obtaining hydrolyzate (C).

Trichlorosilane was hydrolyzed by the method described in Japanese Patent Publication No. 6(1994)41518, and the thus obtained hydrogensilsesquioxane was dissolved in methyl isobutyl ketone. Thus, hydrolyzate (D) was obtained.

3. Preparation of Coating Liquid for Forming Coating Film:

Water and alcohol were distilled off from the above obtained dispersions of short fiber silica (A) and fine particles of silica (B) by the use of a rotary evaporator, and solvent replacement with methyl isobutyl ketone was carried out. The thus obtained silica containing dispersions (A) and (B) and the hydrolyzates (C) and (D) were mixed together in proportions specified in Table 1 and heated at 50° C. for 1 hr. Thereafter, the alcohol and water produced by the heating were completely removed by means of a rotary evaporator, and solvent replacement with methyl isobutyl ketone was carried out again. Thus, coating liquids (1) to (4) having a silica content of 20% by weight were obtained for forming coating film. In addition, coating liquids (5) and (6) having no silica content were prepared.

TABLE 1

| Coating liquid | Silica | Hydrolyzate | Wt. ratio (silica fine particles/hydrolyzate) |
|---|---|---|---|
| 1) | fiber silica (A) | (C) | 9/1 |
| 2) | fiber silica (A) | (D) | 9/1 |
| 3) | silica fine particles (B) | (C) | 9/1 |
| 4) | silica fine particles (B) | (D) | 9/1 |
| 5) | — | (C) | |
| 6) | — | (D) | |

Examples 1 and 2 and Comparative Examples 1 to 4

Semiconductor Device:

Each of the coating liquids (1) to (6) as shown in Table 1 was applied by the spin coating method to a semiconductor substrate furnished with minimum 0.25 μ rule metal wiring and dried at 250° C. for 3 min. Thereafter, heating was conducted at 400° C. for 30 min in a nitrogen gas atmosphere or in a 5% oxygen containing nitrogen gas atmosphere, thereby forming silica coating films with a thickness of 500 nm.

Upper layer metal wiring was formed on the thus prepared silica coating films, thereby obtaining semiconductor devices.

With respect to each of the obtained semiconductor devices, the flattening performance, strength and relative permittivity of silica coating film were measured. The results are given in Table 2.

The flattening performance was evaluated by observing a section of the substrate furnished with coating film by means of an SEM electron microscope; the film strength was evaluated by Sebastian tester; and the relative permittivity was measured according to the mercury probe method.

TABLE 2

| | Coating liquid | Flatness | Film strength | Relative permittivity after N$_2$ atm. heating | after O$_2$ contg. N$_2$ atm. heating |
|---|---|---|---|---|---|
| Ex.1 | 1) | good | strong | 2.2 | 3.0 |
| Ex.2 | 2) | good | strong | 2.1 | 2.8 |
| Comp Ex.1 | 3) | good | weak | 2.3 | 3.1 |
| Comp Ex.2 | 4) | good | weak | 2.2 | 2.8 |
| Comp Ex.3 | 5) | good | strong | 3.0 | 4.5 |
| Comp Ex.4 | 6) | good | strong | 2.7 | 4.2 |

Examples 3 and 4 and Comparative Examples 5 to 8

Color Liquid Crystal Display:

Each of the coating liquids (1) to (6) as shown in Table 1 was applied onto a glass plate furnished with TFT element and heated, thereby forming a silica coating film. Thereafter, an ITO picture element electrode and a polyimide alignment coating as upper layers were formed on the top thereof. The resultant plate and a counter electrode plate comprising a glass plate and, sequentially superimposed thereon, a color filter, a transparent electrode and a polyimide alignment coating were secured to each other, and a liquid crystal layer was interposed therebetween. Thus, matrix color liquid crystal displays furnished with liquid crystal display cell were obtained.

The flattening performance, presence of cracking, presence of cross-talk and display performance of silica coating film were evaluated with respect to each of the thus obtained color liquid crystal displays. The results are given in Table 3.

The cracking and the presence of cross-talk were visually inspected, and the display performance was evaluated by luminance and contrast.

TABLE 3

| | Coating liquid | Flatness | Crack | Cross-talk | Display performance |
|---|---|---|---|---|---|
| Ex.3 | 1) | good | none | none | good |
| Ex.4 | 2) | good | none | none | good |
| Comp Ex.5 | 3) | good | none | none | good |
| Comp Ex.6 | 4) | good | none | none | good |
| Comp Ex.7 | 5) | good | found | found | poor |
| Comp Ex.8 | 6) | good | found | found | poor |

What is claimed is:

1. A process for producing a short fiber silica, comprising the steps of:

adding a catalyst to a solution of a mixture of water, an inorganic solvent and at least one alkoxysilane represented by the general formula $X_n Si(OR)_{4-n}$ to thereby conduct a hydrolysis of the alkoxysilane so that fine particles of silica having a particle size of 10 to 30 nm are produced;

removing any unreacted alkoxysilane, the organic solvent in the catalyst from the thus obtained reaction mixture solution to thereby obtain a water dispersion of fine particles of silica;

regulating so that the water dispersion has a fine particle solid content of 0.1 to 5% by weight and a catalyst concentration of 50 to 400 ppm in the term of ammonia;

subjecting the water dispersion to a hydrothermal treatment at 250° C. or higher temperature; and wherein X represents a hydrogen atom, a flourine atom, an alkyl group having 1 to 8 carbon atoms, an aryl group or a vinyl group; R represents a hydrogen atom, and alkyl group having 1 to 8 carbon atoms; an aryl group or a vinyl group; and n is an integer of 0 to 3.

2. The process for producing a short fiber silica as claimed in claim 1, wherein the catalyst is ammonia.

3. A short fiber silica having an average diameter (D) of 10 to 30 nm, a length (L) of 30 to 100 nm and an aspect ratio (L/D) of 3 to 10, which is obtainable from the process as claimed in claim 1.

* * * * *

UNITED STATES PATENT AND TRADEMARK OFFICE
CERTIFICATE OF CORRECTION

PATENT NO. : 6,455,154 B1 Page 1 of 1
DATED : September 24, 2002
INVENTOR(S) : Akira Nakashima et al.

It is certified that error appears in the above-identified patent and that said Letters Patent is hereby corrected as shown below:

<u>Title page,</u>
Item [73], Assignee, "Catallysts & Chemicals Industries Co., Ltd. (JP)" should read
-- Catalysts & Chemicals Industries Co., Ltd. (JP) --.

<u>Column 1,</u>
Line 6, after "6,083,314" insert -- issued July 24, 2000 --.
Lines 10-11, "the formation of" should read -- for forming porous --.
Line 11, "enables forming" should read -- enables the formation of --.

<u>Column 3,</u>
Line 3, "excellent in adherence" should read -- excellent adherence --.
Line 31, "(11" should read -- [1] --.

<u>Column 7,</u>
Line 11, "3.0%" should read -- 30% --.

Signed and Sealed this

Eighteenth Day of March, 2003

JAMES E. ROGAN
*Director of the United States Patent and Trademark Office*